H. F. STRATTON.
SUPPORTED LAMINATIONS FOR ELECTRIC APPARATUS AND METHOD OF MAKING THE SAME.
APPLICATION FILED SEPT. 21, 1921.
1,432,637.  Patented Oct. 17, 1922.
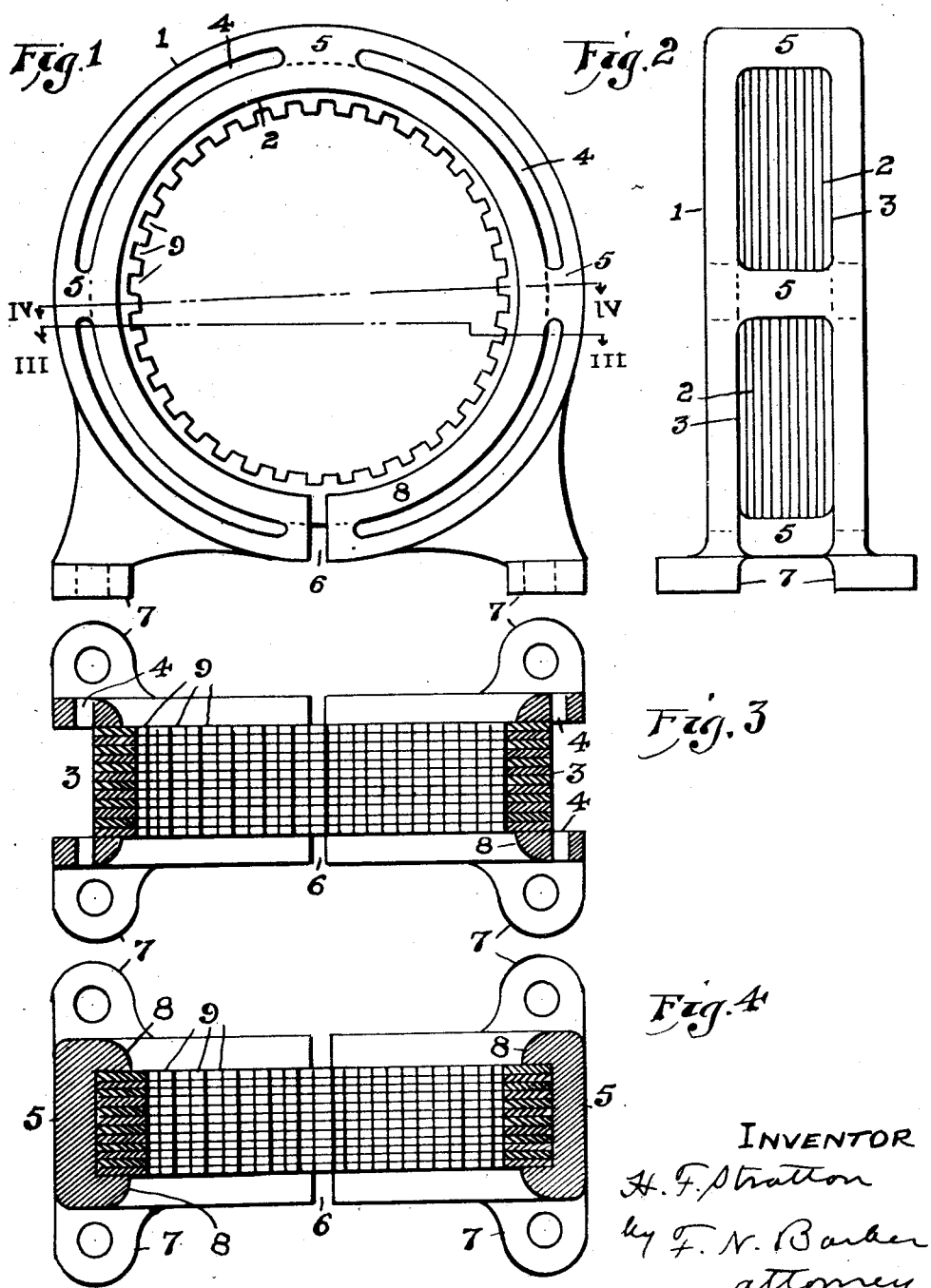

Patented Oct. 17, 1922.

1,432,637

UNITED STATES PATENT OFFICE.

HARRY F. STRATTON, OF CLEVELAND, OHIO, ASSIGNOR TO THE ELECTRIC CONTROLLER & MANUFACTURING COMPANY, OF CLEVELAND, OHIO, A CORPORATION OF OHIO.

SUPPORTED LAMINATIONS FOR ELECTRIC APPARATUS AND METHOD OF MAKING THE SAME.

Application filed September 21, 1921. Serial No. 502,254.

*To all whom it may concern:*

Be it known that I, HARRY F. STRATTON, a citizen of the United States, residing at Cleveland, in the county of Cuyahoga and State of Ohio, have invented new and useful Improvements in Supported Laminations for Electric Apparatus and Methods of Making the Same, of which the following is a specification.

My invention relates to methods of assembling laminated structures with their supports or frames, and also to the combination of such structures with their supports and frames.

It is the principal object of this invention to provide a method whereby an assembly of laminations may have its support or frame cast in such a relation thereto that upon the cooling of the casting, the latter will shrink so as to suitably clamp the laminations tightly together and also tightly clamp the assembly in the casting. Other objects appear hereinafter.

In the specification and drawings, I have described and illustrated the invention as applied to an induction motor, but it is evident that it may be applied to dynamo-electric machines in general, to transformers, and to other types of electrical apparatus.

Referring to the accompanying drawings, Fig. 1 is an elevation of the stator of an induction motor with the windings omitted; Fig. 2, a side elevation thereof; Fig. 3, a section on the line III—III of Fig. 1; and Fig. 4, a section on the line IV—IV of Fig. 1.

On the drawings, 1 designates a cast-metal support or frame for the assembled annular laminations 2 provided at their inner edges with transverse slots 9 for the stator windings, not shown. The annular assembly of laminations is surrounded peripherally by the support or frame having peripheral ventilating slots 3 extending entirely through the support. These slots communicate with lateral ventilating slots 4 extending from the slots 3 to both outer faces of the support. The slots 3 are separated by the crossbars 5, the lower bar 5 as well as the adjacent parts of the frame having the transverse slot 6 which extends entirely through the frame. 7 designates feet for the support. The ends of the support overlap the outer portions of the end faces of the assembled laminations. These overlapping portions are annular ribs or flanges 8 which lie against the outer members of the assembly. The said crossbars 5 engage the periphery of the assembly.

In manufacturing my invention, I support the assembly of laminations by any suitable means and clamp them together by any suitable means, so that all slackness between the laminations is taken up. Then a mold for the frame is formed around the assembled laminations, and molten metal is poured into the mold to form the said frame. As the metal frame cools it shrinks transversely and circumferentially so that the ribs or flanges 8 force the laminations together into a firm unit, and the unit is tightly clamped to the frame between the opposing flanges and by the cross-bars 5. In order to relieve the radial strains on the frame, I may provide the safety slot 6. In case the strains due to the contraction of the metal transversely of the laminations should become so great as to break the frame, I release the said clamping means sufficiently to reduce the strains to a safe value. The amount of release will depend upon the thickness of the assembly of laminations, the degree of tightness to which they are clamped, and the strength of the metal of which the frame is to be made. The subject matter disclosed in the last two preceding sentences is claimed in my application Serial No. 577702, filed July 26, 1922.

The support or frame 1 may be composed of magnetic or non-magnetic metal, as iron, steel, bronze, aluminum, and the like.

I claim:

1. A stator comprising an assembly of annular laminations and a metal frame cast around the same, there being a gap in the frame to prevent fracture of the frame during its cooling.

2. In the manufacture of stators, supporting a group of annular laminations and casting about them an interrupted annulus.

Signed at Cleveland, Ohio, this 14th day of Sept. 1921.

HARRY F. STRATTON.